United States Patent [19]

Henkelmann et al.

[11] 4,192,585

[45] Mar. 11, 1980

[54] SLIDE PROJECTOR WITH AUTOMATIC FOCUSING SYSTEM

[75] Inventors: Kurt Henkelmann, Wissmar; Dietrich Brückner, Nauborn, both of Fed. Rep. of Germany

[73] Assignee: Ernst Leitz Wetzlar GmbH, Wetzlar, Fed. Rep. of Germany

[21] Appl. No.: 884,499

[22] Filed: Mar. 8, 1978

[30] Foreign Application Priority Data

Mar. 25, 1977 [DE] Fed. Rep. of Germany ....... 2713186

[51] Int. Cl.² .............................................. G03B 3/10
[52] U.S. Cl. .................................... 353/101; 350/255; 352/140
[58] Field of Search ........................ 353/101; 352/140; 350/255

[56] References Cited

U.S. PATENT DOCUMENTS

| | | | |
|---|---|---|---|
| 3,249,006 | 5/1966 | Stauffer | 353/101 |
| 3,628,863 | 12/1971 | Kottler | 353/101 |
| 3,976,877 | 8/1976 | Thillays | 250/551 |

*Primary Examiner*—Steven L. Stephan
*Attorney, Agent, or Firm*—Gilbert L. Wells

[57] ABSTRACT

Slide projectors with automatic focusing systems consisting of a scanning auxiliary projecting system and a position control focusing the slide and comprising a light sensor detecting the reflections from the slide are improved by mounting the light sensor outside the scattered light zone generated when the main projection beam passes through the slide. The light source of the auxiliary projecting system is operated at less than rated voltage and silicon cells are used as light detectors. The light course comprises a lens which is mounted in the same manner as the light sensor on holders and the holders are pivotably supported for the purpose of adjustments.

4 Claims, 4 Drawing Figures

SLIDE PROJECTOR WITH AUTOMATIC FOCUSING SYSTEM

CROSS REFERENCE TO A RELATED APPLICATION

Applicants claim priority under 35 USC 119 for application P 27 13 186.8 filed Mar. 25, 1977 in the Patent Office of the Federal Republic of Germany.

BACKGROUND OF THE INVENTION

The field of the invention is slide projectors having systems for automatically focusing the slides to be projected.

The state of the art may be ascertained by reference to U.S. Pat. Nos. 3,399,595; 3,519,992 and 3,639,047, the disclosures of which are incorporated herein. FIG. 4 of U.S. Pat. No. 3,517,992 shows an embodiment of an automatic focusing slide projector wherein the slide guide means is kept stationary, except for a slide changing movement perpendicular to the optical axis, and the projection lens is displaceable along the optical axis as in the present invention.

The present invention relates particularly to a slide projector with an automatic focusing system consisting of a scanning auxiliary projecting system and a position control focusing the slide and comprising a light sensor for the reflections from the slide.

Systems of this kind are known as indicated above. The light detectors used conventionally are photoresistors which recently have included a proportion of selenium to improve the detection. This inclusion of selenium extends the sensitivity into the infrared region of the spectrum, which is advantageous and the insertion of the filters reduces the stray light effect which occurs at the slide when the main illumination beam passes through it and which is almost entirely within the visible spectral range. But, however, filtering also reduces the intensity of the infrared (IR) beams so that a more powerful light source is required for the auxiliary projecting system.

SUMMARY OF THE INVENTION

Having in mind the limitations of the prior art, it is an object of the present invention to provide a scanning auxiliary projecting system which obtains a greater difference in intensities between the measuring light and the stray light without resorting to filters and thereby achieves more accurate measurements. Also the life of the light source of the auxiliary projecting system is increased and the adjustment of the overall equipment is improved.

This is achieved by combining the following characteristics:

(a) the light sensor is mounted outside the stray light zone generated when the main projection beam passes through the slide;

(b) the light source of the auxiliary projecting system is operated below the rated voltage; and (c) silicon cells are used as the light detectors.

The light source of the auxiliary projecting system advantageously is a tubular lamp with a narrow, extended filament. This increases the accuracy of positioning. In addition a lamp is advantageously provided which is designed for intense IR radiation, so as to obtain better adaptation to the spectral response of the silicon cells. Such a light source and lamp is, for example, manufactured by Messrs. PORTALUX of 5568 Daun/Eifel, Germany, and sold under the catalogue No. 20.10.

A further improvement is obtained by using silicon cells as the light detectors which are not imbedded in a glass housing but are merely coated with a crystal-clear protective layer of some sort of a resin. Such silicon cells have, for example, the following manufacturer and designation: SIEMENS AG of Munich, Germany, Type BP 100 or type BPY 11. Not imbedding the silicon cells in a housing but merely covering same by a protective layer has the advantage that the cells may be mounted close to each other on one hand and that the interfering reflections and the illumination otherwise occurring with detectors imbedded in a glass housing are avoided on the other. Such cells furthermore remain stable for a relatively long time in their response characteristics.

It is furthermore appropriately suggested that silicon cells with different edge sizes, for instance in the ratio of 1:2, be used, and they are mounted so that the short edges always are adjacent. This expands the detection area.

In a further embodiment of the concept of the present invention, a lens is associated with the light source and is mounted on supports in the same manner as the light detector, so as to be pivotable for adjustment.

BRIEF DESCRIPTION OF THE DRAWING

The present invention is illustrated and further described below with relation to the appended drawings wherein.

DESCRIPTION OF THE PREFERRED EMBODIMENTS

Figure 1:
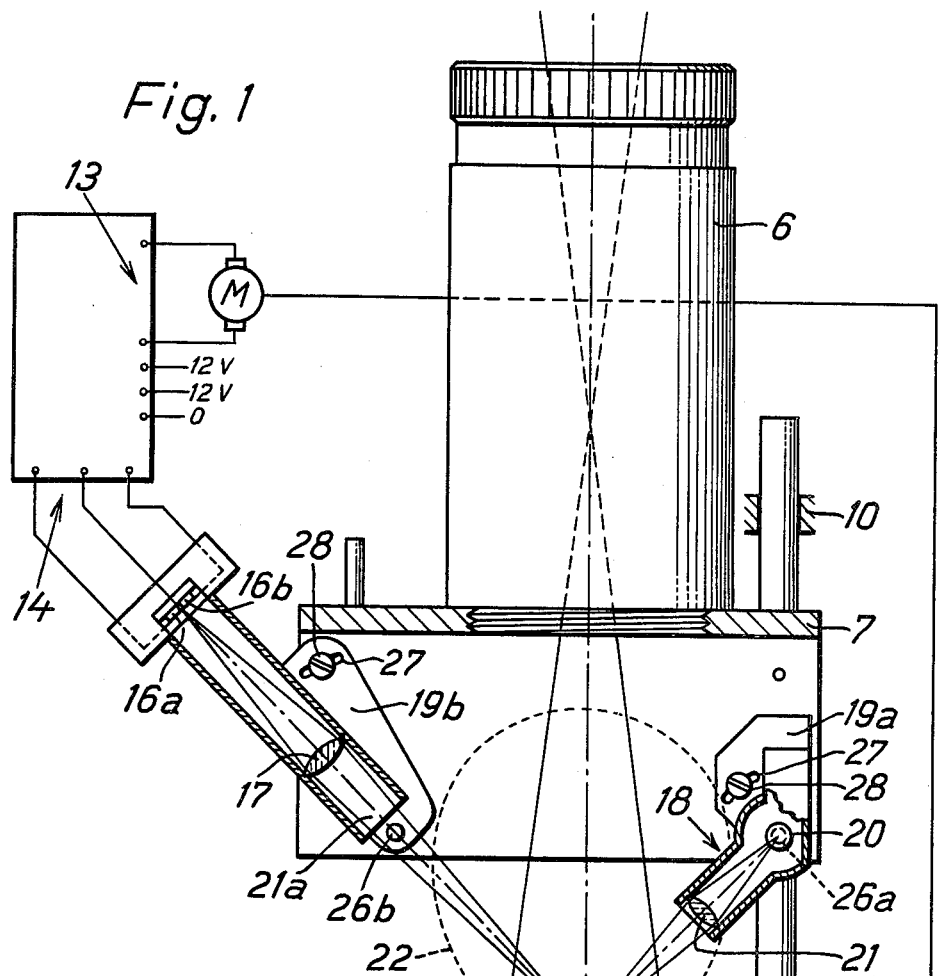
FIG. 1 shows an embodiment of the optical arrangement of a slide projector with an automatic focusing system of the present invention.

The main beam 2 issuing from lamp 1 along the optical axis passes through condenser 3 and heat filter 4 and then through slide 5 and arrives at objective 6 which images the slide on a picture screen. Objective support 7 is mounted to a bar 8 which is displaceably guided in holders 9, 10, which in turn are mounted on the projector. A fork 11 with internal cam actuating surface is mounted on bar or rod 8 and acts as the displacing means and engages cam 12. This cam 12 is driven by motor M which is acted on by control part 13 of positioning system 14. The positioning system 14 comprises sensor 15 with two silicon cells 16a, 16b and objective 17. Positioning system 14 and auxiliary projecting system 18 are mounted to objective support 7 by means of holders 19a, 19b.

The beams emitted by light source 20 of the auxiliary projecting system 18 are imaged by lens 21 on slide 5 and after reflection from this slide are guided to objective 17 on the positioning system. The position of the positioning system is chosen so that the entry aperture 21a lies outside scattering zone 22 generated when the main beam passes through the slide.

Figure 2:
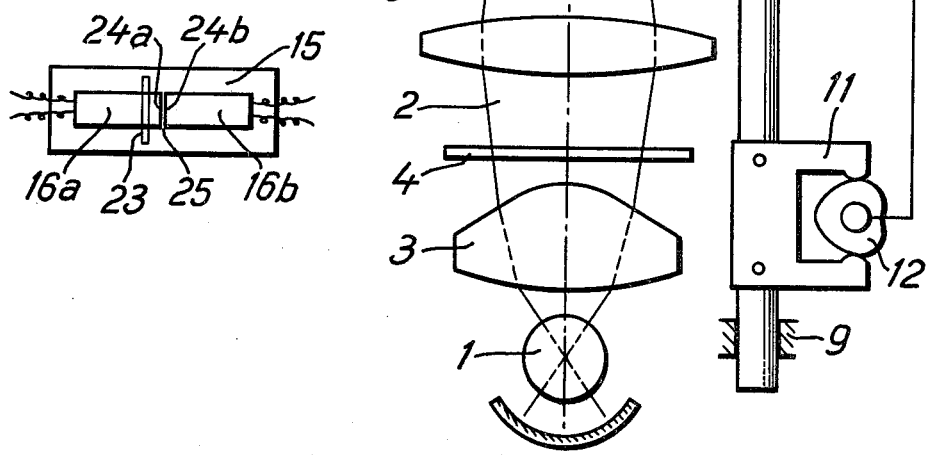
FIG. 2 is the top view of the light sensor of FIG. 1.

Light source 20 is operated at less than rated voltage and consists of a tungsten lamp preferably with IR radiation and a narrow, long filament which is imaged at 23 parallel to the slit 25 formed by the swo silicon cells (FIG. 2).

Holders 19a, 19 b are connected by hinges or pivots 26a, 26b with the objective support. This allows a slight adjustment. To that end. slot 27 is provided with a tightening screw 28.

The two short edges 24a, 24b of the cells 16a, 16b are close together and form separation 25.

Figure 3:
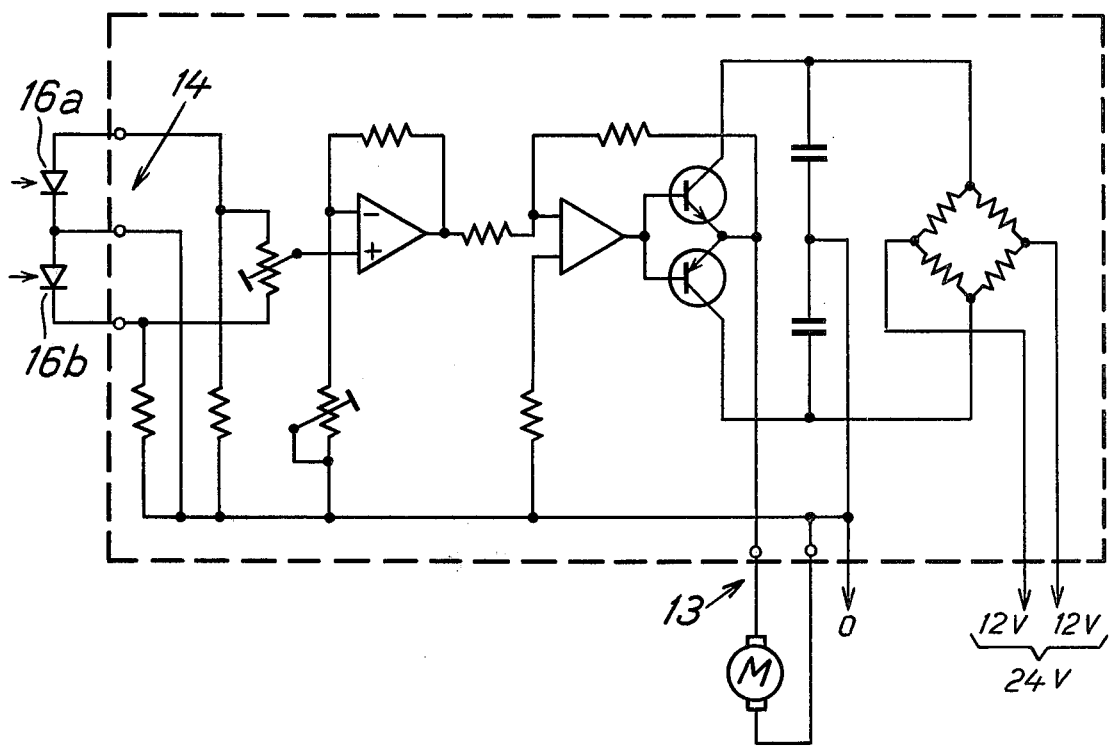
FIG. 3 shows the circuitry of the positioning system 14 and control part 13 of FIG. 1.

FIG. 3 shows diagrammatically the circuitry connecting the silicon cells 16a, 16b with the motor M. The dotted line indicates the control part 13 of FIG. 1. The silicon cells are shown on the left-hand side of the Figure. They are connected to a network of resistors, operational amplifiers and transistors which control the motor M. On the right-hand side of the Figure is shown the power supply which consists of two 12 V terminals and one zero terminal. A more detailed description of the circuitry can be dispensed with since the circuitry itself is not a characteristic element of the invention and is only illustrated by way of example. As a matter of fact any circuitry may be applied as long as it serves the purpose of rotating the motor M in dependence on the light reflected from the slide 5 onto either one of the silicon cells 16a, 16b or on the slit 25.

Figure 4:
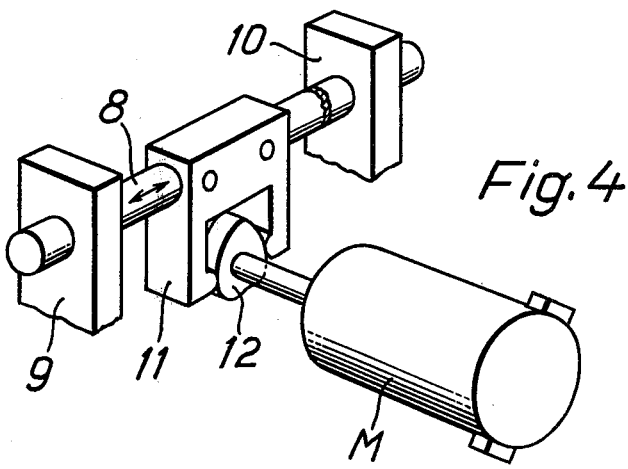
FIG. 4 is a detailed showing of the cam 12 driven by motor M of FIG. 1.

In FIG. 4 the cam 12 is shown in proper connection with the shaft of motor M. This shaft is in FIG. 1 indicated as a mere line. From the Figure it will be comprehended that the fork 11 undergoes a reciprocal motion if the cam 12 is rotated. In the present automatic focussing device, however, the motor M, and hence the cam 12, does not rotate. Rather it only turns in the one or the other direction depending on which of the two silicon cells 16a, 16b the light from the light source 20 impinges after reflection from the slide 5. If the light impinges on the slit 25 the motor M will be at rest.

BEST MODE OF CARRYING OUT THE INVENTION

The best mode of carrying out the invention known to the inventors is to first insert a slide in conventional manner into the light path of the lamp 1.

Then the automatic focusing system is switched on, i.e. the power supply to the light source 20 and to the control part 13 is turned on. The light source and the sensor 15 being of the make and type as hereinbefore described.

An image of the filament of the light source 20 is thus projected onto the surface of the slide 5 and is therefrom reflected to the sensor 15. Depending on what silicon cell 16a or 16b the filament is imaged the shaft of the motor M will be turned in the one or other direction. This also causes the cam 12 to turn and thereby displace the fork 11 together with bar 8 and objective 6.

Since, however, both the projection system 18 and the positioning system 14 of the automatic focusing system are mounted on the same support 7 as the objective the focusing system will move together with the objective. Thereby the spot of reflection on the slide shifts and this causes the image of the light source filament to travel across the surface of the silicon cells 16a, 16b. When the image of the filament reaches the surface of the other silicon cell the motor will be reversed. This function will be maintained until the filament image coincides exactly with the slit 25. The distance between the slide and the projection lens is so adjusted that whenever this occurs the slide is in proper focus of the lens.

We claim:

1. In a slide projector having an automatic focusing system comprising a scanning auxiliary projecting system equipped with a light source projecting a light beam and position control for focusing a slide, a main projection beam passing through said slide along an optical axis, a scattered light zone generated by said slide when said main projection beam passes through said slide, and a light sensor with a lens in front thereof detecting light reflected from said slide after being projected thereon by said scanning auxiliary projecting system, the improvement comprising:
    (a) said lens (17) in front of said light sensor (15) of said scanning auxiliary projecting system arranged with an entry aperture (21a) outside said scattered light zone (22) for increasing the difference in the intensities between the measuring light and light scattered from said main projection beam;
    (b) said light source (20) of said scanning auxiliary projecting system (18) operated below the rated voltage thus increasing the portion of infrared light within said light beam without using respective filter means; and
    (c) silicon cells protectively covered with a layer of crystal-clear resin used in said light sensor.

2. The slide projector of claim 1, wherein a tubular lamp with a narrow, long filament is used as the said light source in the auxiliary projecting system.

3. The slide projector of claim 1, wherein each of said silicon cells have different edge lengths and said silicon cells are mounted next to each other with short edges (24a, 24b) adjacent to define a slit (25) between them.

4. The slide projector of claim 1, wherein said light source comprises a lens (21) mounted in the same manner as said light sensor on holders (19a, 19b), said holders pivotably supported for the purpose of adjustments.

* * * * *